United States Patent
Hatton

(10) Patent No.: US 9,168,895 B2
(45) Date of Patent: *Oct. 27, 2015

(54) KEY FOB SECURITY COPY TO A MOBILE PHONE

(71) Applicant: FORD GLOBAL TECHNOLOGIES, LLC, Dearborn, MI (US)

(72) Inventor: David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,339

(22) Filed: Mar. 6, 2015

(65) Prior Publication Data

US 2015/0175127 A1    Jun. 25, 2015

Related U.S. Application Data

(63) Continuation of application No. 13/802,990, filed on Mar. 14, 2013, now Pat. No. 9,002,536.

(51) Int. Cl.
 *G06F 7/00* (2006.01)
 *G06F 17/00* (2006.01)
 *H04W 4/00* (2009.01)
 *B60R 25/24* (2013.01)
 (Continued)

(52) U.S. Cl.
 CPC .............. *B60R 25/24* (2013.01); *G07C 9/00309* (2013.01); *H04B 1/3816* (2013.01)

(58) Field of Classification Search
 None
 See application file for complete search history.

(56) References Cited

U.S. PATENT DOCUMENTS

| 4,543,569 A | 9/1985 | Karlstrom |
| 5,081,667 A | 1/1992 | Drori et al. |
| 5,467,070 A | 11/1995 | Drori et al. |

(Continued)

FOREIGN PATENT DOCUMENTS

| CN | 1863052 | 11/2006 |
| CN | 101596895 | 12/2009 |

(Continued)

OTHER PUBLICATIONS

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

(Continued)

*Primary Examiner* — James Trammell
*Assistant Examiner* — Demetra Smith-Stewart
(74) *Attorney, Agent, or Firm* — Jennifer M. Stec; Brooks Kushman P.C.

(57) ABSTRACT

A vehicle computing system configured to program a mobile device as a key fob. The vehicle computing system includes a processor and a user interface. The user interface is configured to receive input from a user. The processor is configured to detect a valid key fob configured to control one or more vehicle control functions. The processor may transmit vehicle security codes for programming a connected mobile device to implement the one or more vehicle control functions based on a request to create a mobile device key fob via the user interface and a detected valid key fob. Once programmed, the mobile device may implement one or more vehicle control functions on the mobile device when the valid key fob is not present.

20 Claims, 6 Drawing Sheets

(51) Int. Cl.
   *G07C 9/00*      (2006.01)
   *H04B 1/3816*    (2015.01)

(56) References Cited

U.S. PATENT DOCUMENTS

| | | |
|---|---|---|
| 5,513,107 A | 4/1996 | Gormley |
| 5,627,510 A | 5/1997 | Yuan |
| 5,635,916 A | 6/1997 | Bucholtz et al. |
| 5,655,081 A | 8/1997 | Bonnell et al. |
| 5,734,336 A | 3/1998 | Smithline |
| 5,776,031 A | 7/1998 | Minowa et al. |
| 5,828,319 A | 10/1998 | Tonkin et al. |
| 5,874,889 A | 2/1999 | Higdon et al. |
| 5,959,540 A | 9/1999 | Walter |
| 6,018,291 A | 1/2000 | Marble et al. |
| 6,133,825 A | 10/2000 | Matsuoka |
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |
| 6,271,745 B1 | 8/2001 | Anzai et al. |
| 6,282,226 B1 | 8/2001 | Furukawa |
| 6,434,455 B1 | 8/2002 | Snow et al. |
| 6,434,486 B1 | 8/2002 | Studt et al. |
| 6,438,491 B1 | 8/2002 | Farmer |
| 6,539,078 B1 | 3/2003 | Hunt et al. |
| 6,574,734 B1 | 6/2003 | Colson et al. |
| 6,590,495 B1 | 7/2003 | Behbehani |
| 6,668,221 B2 | 12/2003 | Harter, Jr. et al. |
| 6,679,702 B1 | 1/2004 | Rau |
| 6,690,260 B1 | 2/2004 | Ashihara |
| 6,737,963 B2 | 5/2004 | Gutta et al. |
| 6,754,562 B2 | 6/2004 | Strege et al. |
| 6,785,542 B1 | 8/2004 | Blight et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 6,941,194 B1 | 9/2005 | Dauner et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,161,563 B2 | 1/2007 | Vitale et al. |
| 7,173,903 B2 | 2/2007 | Remboski et al. |
| 7,194,069 B1 | 3/2007 | Jones et al. |
| 7,207,041 B2 | 4/2007 | Elson et al. |
| 7,228,213 B2 | 6/2007 | Sakai et al. |
| 7,246,062 B2 | 7/2007 | Knott et al. |
| 7,266,438 B2 | 9/2007 | Kellum et al. |
| 7,337,113 B2 | 2/2008 | Nakagawa et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,484,008 B1 | 1/2009 | Gelvin et al. |
| 7,565,230 B2 | 7/2009 | Gardner et al. |
| 7,602,782 B2 | 10/2009 | Doviak et al. |
| 7,783,475 B2 | 8/2010 | Neuberger et al. |
| 7,812,712 B2 | 10/2010 | White et al. |
| 7,826,945 B2 | 11/2010 | Zhang et al. |
| 8,050,817 B2 | 11/2011 | Moinzadeh |
| 8,050,863 B2 | 11/2011 | Trepagnier et al. |
| 8,089,339 B2 | 1/2012 | Mikan et al. |
| 8,232,864 B2 | 7/2012 | Kakiwaki |
| 8,237,554 B2 | 8/2012 | Miller et al. |
| 8,258,939 B2 | 9/2012 | Miller et al. |
| 8,301,108 B2 | 10/2012 | Naboulsi |
| 8,305,189 B2 | 11/2012 | Miller et al. |
| 8,311,722 B2 | 11/2012 | Zhang et al. |
| 8,335,502 B2 | 12/2012 | Oesterling et al. |
| 2001/0021891 A1 | 9/2001 | Kusafuka et al. |
| 2002/0013650 A1 | 1/2002 | Kusafuka et al. |
| 2002/0031228 A1 | 3/2002 | Karkas et al. |
| 2002/0096572 A1 | 7/2002 | Chene et al. |
| 2002/0097145 A1 | 7/2002 | Tumey et al. |
| 2003/0004730 A1 | 1/2003 | Yuschik |
| 2003/0055643 A1 | 3/2003 | Woestemeyer et al. |
| 2003/0079123 A1 | 4/2003 | Mas Ribes |
| 2003/0217148 A1 | 11/2003 | Mullen et al. |
| 2003/0220725 A1 | 11/2003 | Harter, Jr. et al. |
| 2003/0231550 A1 | 12/2003 | MacFarlane |
| 2004/0046452 A1 | 3/2004 | Suyama et al. |
| 2004/0073367 A1 | 4/2004 | Altan et al. |
| 2004/0088205 A1 | 5/2004 | Geisler et al. |
| 2004/0124968 A1 | 7/2004 | Inada et al. |
| 2004/0176906 A1 | 9/2004 | Matsubara et al. |
| 2004/0227642 A1 | 11/2004 | Giles et al. |
| 2004/0236475 A1 | 11/2004 | Chowdhary |
| 2005/0021597 A1 | 1/2005 | Derasmo et al. |
| 2005/0033517 A1 | 2/2005 | Kondoh et al. |
| 2005/0125110 A1 | 6/2005 | Potter et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama et al. |
| 2005/0193212 A1 | 9/2005 | Yuhara |
| 2005/0261816 A1 | 11/2005 | DiCroce et al. |
| 2006/0056663 A1 | 3/2006 | Call |
| 2006/0142917 A1 | 6/2006 | Goudy |
| 2006/0150197 A1 | 7/2006 | Werner |
| 2006/0156315 A1 | 7/2006 | Wood et al. |
| 2006/0220904 A1 | 10/2006 | Jarlengrip |
| 2006/0250224 A1 | 11/2006 | Steffel et al. |
| 2006/0293813 A1 | 12/2006 | Nou |
| 2007/0027595 A1 | 2/2007 | Nou |
| 2007/0050854 A1 | 3/2007 | Cooperstein et al. |
| 2007/0072616 A1 | 3/2007 | Irani |
| 2007/0100514 A1 | 5/2007 | Park |
| 2007/0103339 A1 | 5/2007 | Maxwell et al. |
| 2007/0255568 A1 | 11/2007 | Pennock |
| 2008/0070616 A1 | 3/2008 | Yun |
| 2008/0109653 A1 | 5/2008 | Yokohama |
| 2008/0148374 A1 | 6/2008 | Spaur et al. |
| 2008/0150683 A1 | 6/2008 | Mikan et al. |
| 2008/0275604 A1 | 11/2008 | Perry et al. |
| 2009/0030605 A1 | 1/2009 | Breed |
| 2009/0045928 A1 | 2/2009 | Rao et al. |
| 2009/0096596 A1 | 4/2009 | Sultan et al. |
| 2009/0167524 A1 | 7/2009 | Chesnutt et al. |
| 2009/0184800 A1 | 7/2009 | Harris |
| 2009/0195370 A1 | 8/2009 | Huffman et al. |
| 2009/0275281 A1 | 11/2009 | Rosen |
| 2009/0309709 A1 | 12/2009 | Bevacqua et al. |
| 2010/0004818 A1 | 1/2010 | Phelan |
| 2010/0007479 A1 | 1/2010 | Smith |
| 2010/0013596 A1 | 1/2010 | Kakiwaki |
| 2010/0030458 A1 | 2/2010 | Coughlin |
| 2010/0039224 A1 | 2/2010 | Okude et al. |
| 2010/0057586 A1 | 3/2010 | Chow |
| 2010/0075656 A1 | 3/2010 | Howarter et al. |
| 2010/0097178 A1 | 4/2010 | Pisz et al. |
| 2010/0148923 A1 | 6/2010 | Takizawa |
| 2010/0178872 A1 | 7/2010 | Alrabady et al. |
| 2010/0191535 A1 | 7/2010 | Berry et al. |
| 2010/0191973 A1 | 7/2010 | Huntzicker et al. |
| 2010/0321203 A1 | 12/2010 | Tieman et al. |
| 2011/0009107 A1 | 1/2011 | Guba et al. |
| 2011/0018793 A1 | 1/2011 | Chen et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0102146 A1 | 5/2011 | Giron |
| 2011/0105097 A1 | 5/2011 | Tadayon et al. |
| 2011/0106374 A1 | 5/2011 | Margol et al. |
| 2011/0112969 A1 | 5/2011 | Zaid et al. |
| 2011/0148574 A1 | 6/2011 | Simon et al. |
| 2011/0166748 A1 | 7/2011 | Schneider et al. |
| 2011/0213629 A1 | 9/2011 | Clark et al. |
| 2011/0215921 A1 | 9/2011 | Ayed et al. |
| 2011/0275321 A1 | 11/2011 | Zhou et al. |
| 2011/0295444 A1 | 12/2011 | Westra et al. |

(56) References Cited

U.S. PATENT DOCUMENTS

| | | |
|---|---|---|
| 2012/0041633 A1 | 2/2012 | Schunder et al. |
| 2012/0054036 A1 | 3/2012 | Nam et al. |
| 2012/0071140 A1 | 3/2012 | Oesterling et al. |
| 2012/0115446 A1 | 5/2012 | Gautama et al. |
| 2012/0139760 A1 | 6/2012 | Bevacqua et al. |
| 2012/0157069 A1 | 6/2012 | Elliott et al. |
| 2012/0280786 A1 | 11/2012 | Miller et al. |
| 2012/0284702 A1 | 11/2012 | Ganapathy et al. |
| 2012/0293317 A1 | 11/2012 | Hanna et al. |
| 2012/0313768 A1 | 12/2012 | Campbell et al. |
| 2013/0005302 A1 | 1/2013 | Ozaki |
| 2013/0162421 A1 | 6/2013 | Inaguma et al. |
| 2013/0200999 A1 | 8/2013 | Spodak et al. |
| 2013/0204455 A1 | 8/2013 | Chia et al. |
| 2013/0259232 A1 | 10/2013 | Petel |
| 2013/0278381 A1 | 10/2013 | Lopez et al. |
| 2014/0040621 A1 | 2/2014 | Klimke |
| 2014/0176301 A1 | 6/2014 | Fernandez et al. |

FOREIGN PATENT DOCUMENTS

| | | |
|---|---|---|
| DE | 102007046270 | 4/2009 |
| EP | 0449471 | 10/1991 |
| EP | 0971463 | 1/2000 |
| EP | 0971463 | 5/2001 |
| JP | 2008195253 | 8/2008 |
| JP | 2008303630 | 12/2008 |
| WO | 0125572 | 4/2001 |
| WO | 2009158469 | 12/2009 |
| WO | 2012015403 | 2/2012 |

OTHER PUBLICATIONS

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com pp. 1-3.

Autobiometrics, Com, US Distributor for ATRD Biometric Immobilizer, http://www.autobiometrics.com, Jul. 6, 2011.

SALES@usasupremetech.com, In the U.S. a Car is Stolen Every 26 Seconds, The Wave of the Future, Biometrics Authentication, An Introduction.

SALES@usasupremetech.com, In the U.S. a Car is Stolen Every 26 Seconds, The Wave of the Future, Biometrics Authentication, An Introduction, Jul. 22, 2014.

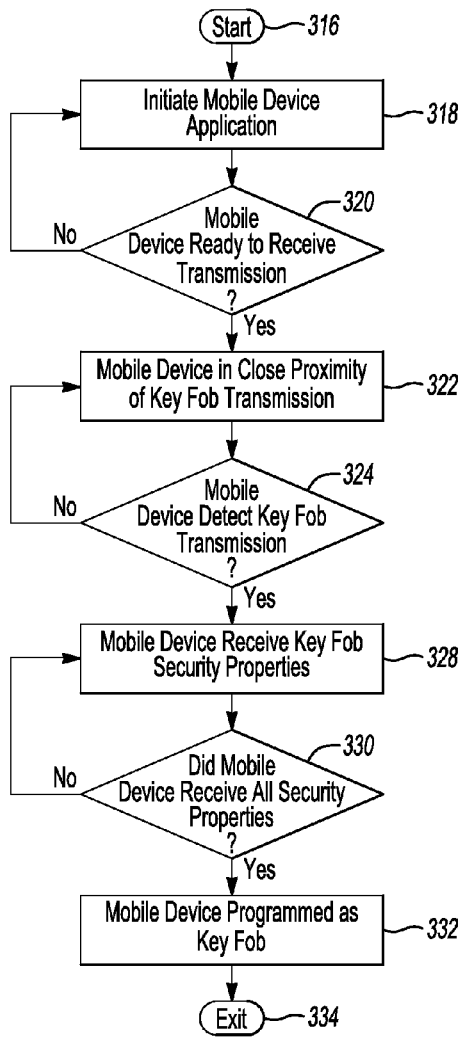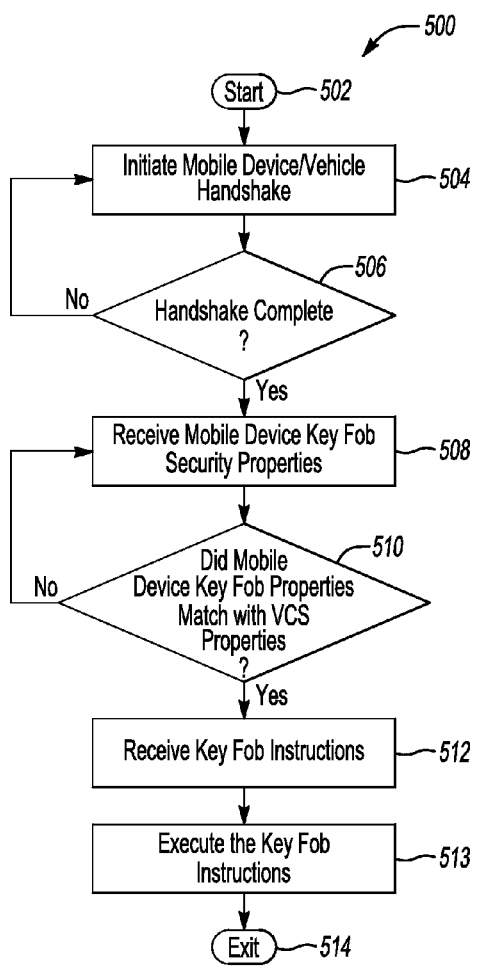
Fig-3B
Fig-5

KEY FOB SECURITY COPY TO A MOBILE PHONE

CROSS-REFERENCE TO RELATED APPLICATIONS

This application is a continuation of U.S. application Ser. No. 13/802,990 filed Mar. 14, 2013, now U.S. Pat No. 9,002,536 issued on Apr. 7, 2015, which is hereby incorporated in its entirety by reference herein.

TECHNICAL FIELD

The present invention relates to an electronic key system and a vehicle computing system for managing a vehicle electronic key.

BACKGROUND

U.S. Pat. No. 8,089,339 generally discloses a wireless device for providing secure operation of a vehicle. In one such method, a key for accessing a vehicle is detected, a vehicle operation policy associated with the key is retrieved, and operation of the vehicle consistent with the vehicle operation policy is permitted. The key may be embedded within a wireless device such as a cellular telephone. The vehicle operation policy may include an access control rule that may indicate to enable, partially enable, or disable a vehicle operation feature. Where the intended operation of the vehicle is not consistent with the access control rule, the operation may not be permitted and an enforcement action may be taken, such as disabling a feature of the vehicle.

U.S. Pat. No. 8,232,864 generally discloses an electronic key system includes a vehicle equipped with vehicle equipment, and a mobile phone having an electronic key function including ID information for the vehicle equipment. The vehicle equipment compares the ID information of the electronic key provided in the mobile phone with standard ID information of the vehicle equipment, makes the vehicle and/or the vehicle equipment perform a first operation when the ID information match and a second operation when the ID information cannot be detected. The vehicle equipment transmits history information along with the first and second operations to the mobile phone.

U.S. Patent Application US2009/0184800 generally discloses a cell phone that is mated with the vehicle system and thereafter used to obtain access to the vehicle. A user who has a cell phone automatically can obtain access to the vehicle. An embodiment describes a USB key that provides access to the vehicle, and in an emergency, either a complete or partial version of the key can be downloaded from a server.

SUMMARY

In a first illustrative embodiment, a mobile device enabling one or more processor to receive vehicle key security codes. The mobile device may receive a signal from a transmitter associated with a vehicle key, the signal being indicative of one or more security codes associated with the vehicle key. The mobile device may store the one or more security codes in memory and configure a mobile device application to implement one or more vehicle control functions using the security codes. The mobile device may wirelessly transmit commands for implementing the one or more vehicle control functions using the security codes to a vehicle associated with the key. The wireless transmission of commands may include short range wireless communication.

In a second illustrative embodiment, a key fob apparatus may enable a circuit having a transmitter to transmit vehicle security codes to one or more mobile devices using short range wireless communication. The key fob may receive an input using one or more buttons for initializing wireless transmission of a security code signal. The key fob may wirelessly transmit the security code signal to a handheld computing device to enable the handheld to wirelessly perform one or more vehicle control functions.

In a third illustrative embodiment, a method for programming a mobile device using a vehicle key to allow keyless control of vehicle features and functions. The method may include receiving a signal from a transmitter associated with a vehicle key. The vehicle key signal being indicative of one or more security codes associated with the vehicle key. The method may store the one or more security codes in memory and configure a mobile device application to implement one or more vehicle control functions using the security codes. The method may wirelessly transmit commands for implementing the one or more vehicle control functions using the security codes to a vehicle associated with the key.

In a fourth illustrative embodiment, a vehicle computing system having a processor, a backup slot and a user interface. The processor is in communication with the backup slot and the user-interface display. The processor may be programmed to prompt a driver via the user-interface display to place a mobile device at the backup slot based on a customer security code transfer request. The processor may be further programmed to transmit one or more vehicle computing system security codes to the mobile device based on the mobile device being placed at the backup slot. The mobile device having the one or more vehicle computing system security codes may implement one or more vehicle control functions.

In a fifth illustrative embodiment, a vehicle computing system having a processor programmed to detect a valid key fob configured to control a vehicle control function. The processor may be further programmed to transmit vehicle security codes to a connected mobile device based on a request to create a mobile device key fob via a user interface and a detected valid key fob. The mobile device key fob having the vehicle security codes may implement the vehicle control function on the mobile device key fob when the valid key fob is not present.

In a sixth illustrative embodiment, a vehicle computing system includes at least one processor may be programmed to receive a request to create a mobile device key fob from a user interface. The processor may be further programmed to transmit vehicle security codes to a backup slot for communication to a mobile device based on the received request. The vehicle security codes may enable the mobile device to implement one or more vehicle control functions on the mobile device when the valid key fob is not present

BRIEF DESCRIPTION OF THE DRAWINGS

FIG. 3B is a flow chart illustrating an example method of initializing a mobile device to receive key fob security codes;

FIG. 5 is a flow chart illustrating an example method of a vehicle computing system receiving instructions from a mobile device key fob.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
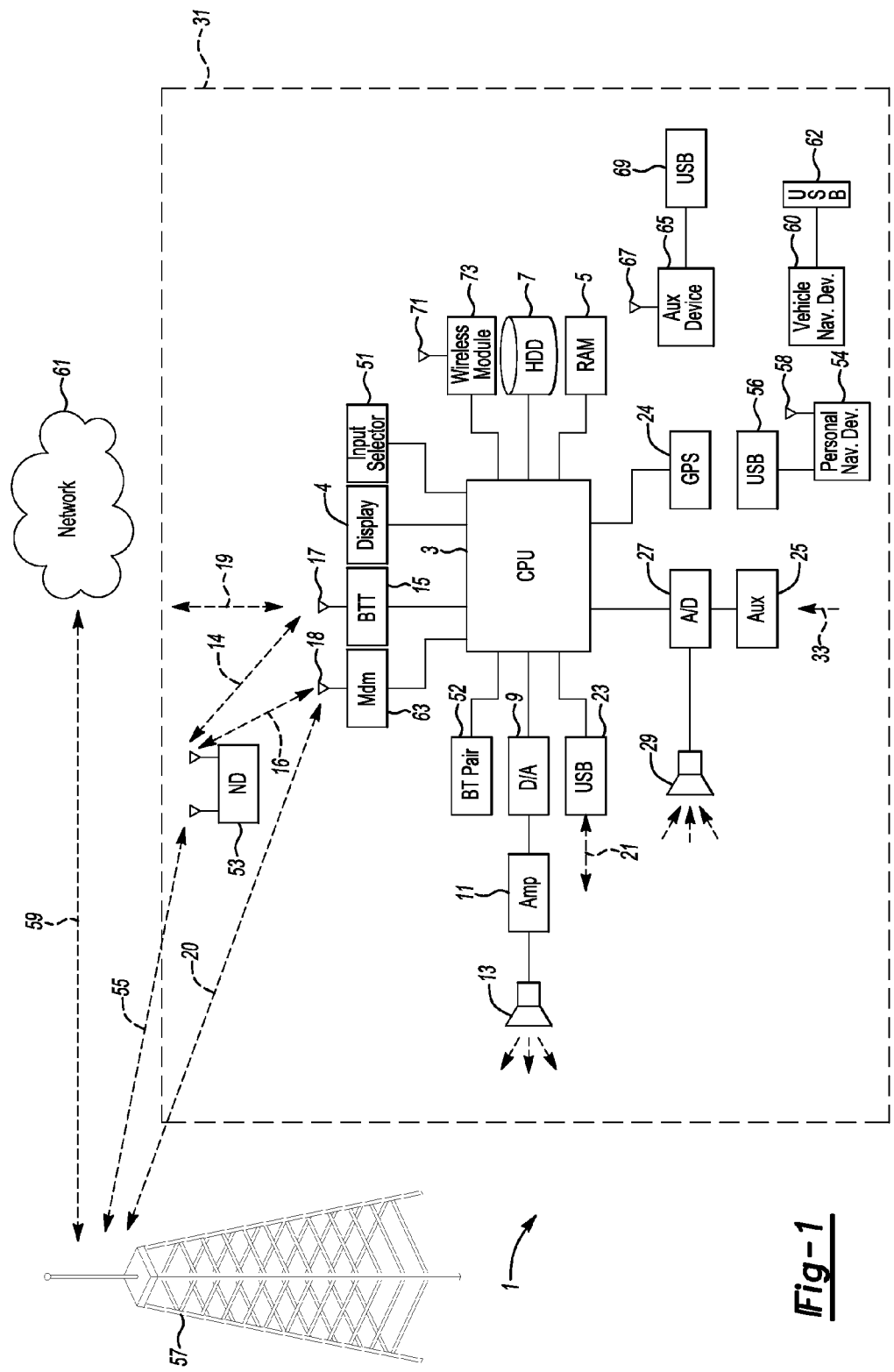
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The embodiments of the present invention generally provides for a mobile device to be programmed to control functional operations as a key fob. In general, the key fob may be designed to allow for transmission of security codes using a secured method of wireless communication including, but not limited to, near field communication. The embodiments of the present invention provide a system and method allowing a key fob the ability to transmit security codes to a mobile device, therefore using the mobile device in place of the key fob to communicate with the vehicle computing system.

The various operations that are capable of being controlled by the mobile device operating as a key may include, but is not limited to, entering the vehicle, exiting the vehicle, starting the vehicle, and/or opening the trunk. The embodiments of the present invention as set forth in FIGS. 1-6 generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers (or modules) may be combined with each other and/or separated in any manner based on the particular type of electrical architecture that is desired or intended to be implemented in the vehicle and/or mobile device.

Figure 2A:
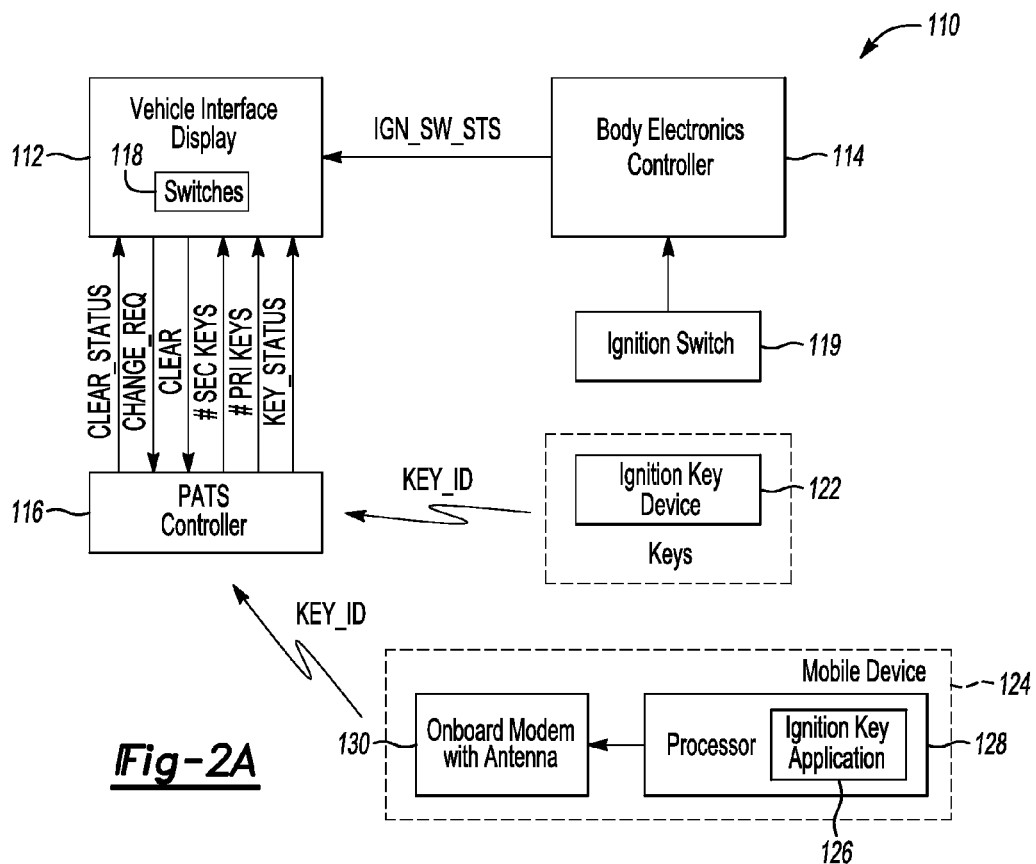
FIG. 2A depicts a system for programming keys to a vehicle to establish primary and secondary drivers in accordance to one embodiment of the present invention.

Referring now to FIG. 2A, a system 110 in communication and/or embedded with the VCS 1 may program keys to a vehicle to establish primary and secondary drivers in accordance to one embodiment of the present invention is shown. The system 110 includes a vehicle interface display 112, a body electronics controller 114, and a passive anti-theft security (PATS) controller 116. The vehicle interface display 112 may be implemented as a message center on an instrument cluster or as a touch screen monitor such that each device is generally configured to present text, menu options, status or other such inquiries to the driver in a visual format. A driver may scroll through the various fields of text and select menu options via at least one switch 118 positioned about the interface display 112. The switch 118 may be remotely positioned from the interface display 112 or positioned directly on the interface display 112. The vehicle interface display 112 may be any such device that is generally situated to provide information and receive feedback to/from a vehicle occupant. The switches 118 may be in the form of voice commands, touch screen, and/or other such external devices (e.g., phones, computers, etc.) that are generally configured to communicate with the electrical system of the vehicle.

The interface display 112, the PATS controller 116, and the body electronics controller 114 may communicate with each other via a multiplexed data link communication bus (or multiplexed bus). The multiplexed bus may be implemented as a High/Medium Speed Controller Area Network (CAN) bus, a Local Interconnect Network (LIN), or any such suitable data link communication bus generally situated to facilitate data transfer between controllers (or modules) in the vehicle.

The body electronics controller 114 generally controls a portion or all of the electrical content in an interior section of the vehicle. In one example, the body electronics controller 114 may be a smart power distribution junction box (SPDJB) controller. The SPDJB controller may include a plurality of fuses, relays, and various micro-controllers for performing any number of functions related to the operation of interior and/or exterior electrically based vehicle functionality. Such functions may include but are not limited to electronic unlocking/locking (via interior door lock/unlock switches), remote keyless entry operation, vehicle lighting (interior and/ or exterior), electronic power windows, and/or key ignition status (e.g., Off, Run, Start, Accessory (ACCY)).

An ignition switch 119 may be operably coupled to the body electronics controller 114. The body electronics controller 114 may receive hardwired signals indicative of the position of the ignition switch and transmit multiplexed messages on the multiplexed bus that are indicative of the position of the ignition switch. For example, the body electronics controller 114 may transmit a signal IGN_SW_STS (e.g., whether the ignition is in the OFF, Run, Start, or Accessory (ACCY) positions) over the multiplexed bus to the vehicle interface display 112. The signal IGN_SW_STS generally corresponds to the position of the ignition switch (e.g., Off, Run, Start, or Accessory positions).

The ignition switch 119 may receive two or more keys 120 to start the vehicle. Each key 120 includes an ignition key device 122 embedded therein for communicating with the vehicle. The ignition key device 122 comprises a transponder (not shown). The transponder includes an integrated circuit and an antenna. The transponder is adapted to transmit a signal KEY_ID in the form of a radio frequency (RF) signal to the PATS controller 116. The signal KEY_ID generally comprises RF data that corresponds to a manufacturer code, a corresponding key serial number and encrypted data. The key serial number and the encrypted data are used to authorize the engine controller to start the vehicle in the event the encrypted data corresponds to predetermined encrypted data stored in a look up table (LUT) of the PATS controller 116. The PATS controller 116 may use the key number and/or the encrypted data transmitted on the signal KEY_ID to determine if the key is a primary key or a secondary key. In general, the driver who holds the primary key is presumed to be a primary driver. The driver who holds the secondary key is presumed to be a secondary driver. The manufacturer code generally corresponds to who the manufacturer of the vehicle is. For example, the manufacturer code may correspond to Ford Motor Company. Such a code prevents the user (or technician) from mistakenly configuring a key with a manufacturer code of another vehicle manufacturer to a Ford vehicle. An example of a LUT that may be stored in the PATS controller 116 is shown in TABLE 1 directly below.

TABLE 1

| KEY SERIAL # | MAN. CODE | ENCRYPTED DATA | TYPE |
| --- | --- | --- | --- |
| 1xxA | Ford | #$#$#$#$#$#$#$# | Primary |
| 2xxB | Ford | #######$$$$$$$$ | Secondary |
| 3xxC | Ford | $#$#$#$#$#$#$#$ | Secondary |
| NnnN | Ford | $$$$$$$######## | Primary |

The LUT may include any number of keys. To start the vehicle, the PATS controller 116 decodes the key serial number, the manufacturing code, and corresponding encrypted data received on the signal KEY_ID and compares such data to the key serial number and the encrypted data in the LUT to determine whether such data match prior to starting the vehicle for anti-theft purposes. In the event the data matches, the engine controller operably coupled to the PATS controller 116 allows the vehicle to start the engine.

In another embodiment, a mobile device 124 may be configured using a software application to communicate with the VCS and/or PATS Controller 116. The mobile device may include, but is not limited to, cellular phone, tablet, and/or personal computer. The VCS and/or PATS controller may recognize a paired mobile device is either a primary key or secondary key holder. The mobile device may be recognized by the VCS as a primary or secondary key using a software application communicating with the VCS and/or PATS controller 116. The mobile device may include a transceiver to transmit a signal to the VCS and/or PATS controller 116 using wireless communication including, but not limited to, Bluetooth technology, WiFi, cellular communication. An example of a LUT that may be stored in the PATS controller 116 is shown in TABLE 2 directly below.

TABLE 2

| KEY SERIAL # | MAN. CODE | ENCRYPTED DATA | PAIRED MOBILE DEVICE TYPE |
| --- | --- | --- | --- |
| 1xxA | Ford | #$#$#$#$#$#$#$# | Primary |
| 2xxB | Ford | #######$$$$$$$$ | Secondary |
| 3xxC | Ford | $#$#$#$#$#$#$#$ | Secondary |
| NnnN | Ford | $$$$$$$######## | Primary |

For example, once the hardwired signals indicative of the position of the ignition switch 119 have been transmitted, the PATS controller and/or VCS may recognize the mobile device 124. The mobile device 124 may a software application 126 running in a processor 128 on the device to transmit a vehicle control signal using an onboard modem with antenna 128 to communicate with a vehicle. The PATS controller and/or VCS may recognize the mobile device associated to a user using one or more of the key serial number, manufacturing code in combination with the mobile device transmitted encrypted data. The PATS and/or VCS may recognize the paired mobile device from the received KEY_ID signal using one or more wireless communication technologies including, but not limited to Bluetooth, WiFi, cellular, and/or near field communication.

In another alternative example, the mobile device 124 may transmit the KEY_ID signal directly to the PATS controller 116 using an ignition key application 124 transmitting a short range wireless communication (e.g. radio frequency identification). For example, the hardwired signal indicative of the position of the ignition switch 119 may initiate the VCS to begin searching for the mobile device. The mobile device may communicate with the VCS using the ignition key application allowing the VCS to recognize if the mobile device has been paired. The VCS may determine based on the encrypted data received from the mobile device, and/or the VCS previous configuration of the paired mobile device, if it is assigned a primary or secondary key designation.

To determine driver status, the PATS controller 116 decodes the key number and/or the encrypted data received on the signal KEY_ID and reads the corresponding key status (e.g., primary or secondary) next to the key number and/or the encrypted data as shown in the heading 'TYPE' of Table 1, and respectively Table 2, to determine whether the key and/or mobile device is the primary key or the secondary key. The PATS controller 116 transmits a signal KEY_STATUS to the vehicle interface display 112 to indicate whether the key is a primary key or a secondary key. The PATS controller 116 and/or the vehicle interface display 112 may transmit the signal KEY_STATUS to any controller or module in the electrical system such that the functionality or operation performed by a particular controller (or module) may be selectively controlled based on the key status (and/or the driver status).

The LUT in the PATS controller 116 assigns all of the keys and/or the associated mobile device as primary keys when the vehicle is manufactured in a default condition. The PATS controller 116 may update the key status for a key number in response to the driver changing the key status for a particular key via operations performed between the primary driver and the vehicle interface display 112 and/or configuring the software application 126 on the mobile device 124. In another exemplary embodiment, the vehicle interface display 112 updates and changes may be communicated to the mobile device 124 software application 126 using the communication established between the mobile device 124 and VCS.

The primary driver may optionally clear all keys that were designated as secondary keys via the vehicle interface display 112 and/or using the mobile device application. In such a case, the primary driver may select the corresponding menus via the vehicle interface display 112 and/or on the mobile device using the mobile application to clear all keys that were programmed as secondary keys. The vehicle interface display 112 transmits a signal CLEAR to control the PATS controller 116 to clear (or change) the secondary keys to primary keys. The PATS controller 116 may transmit a signal CLEAR_STATUS to the vehicle interface display 112 to notify the vehicle interface display 112 that the keys programmed as secondary keys have been changed to primary keys. The PATS controller 116 transmits signals #PRIKEYS and #SECKEYS to the interface display 112 which are indicative of the number of primary keys in the LUT and the number of secondary keys in the LUT, respectively. The PATS controller 116 transmits the signals #PRIKEYS and #SECKEYS in response to control signals (not shown) by the vehicle interface display 112. It is generally contemplated that the signals KEY_STATUS, #PRIKEYS, and #SECKEYS (as well as the signal CLEAR_STATUS) may be sent as one or more messages over the multiplexed bus to the vehicle interface display 112. For example, the data on the signals KEY_STATUS, #PRIKEYS, #SECKEYS, CLEAR_STATUS may be transmitted as hexadecimal based data within a single message over the multiplexed data bus. Likewise, the vehicle interface display 112 may transmit the data on the signals CHANGE_REQ and CLEAR as hexadecimal based data within a single message over the multiplexed data bus. The PATS controller 116 may be integrated within the vehicle interface display 112 or be implemented as a standalone component or as controller embedded within another controller in the vehicle.

Figure 2B:
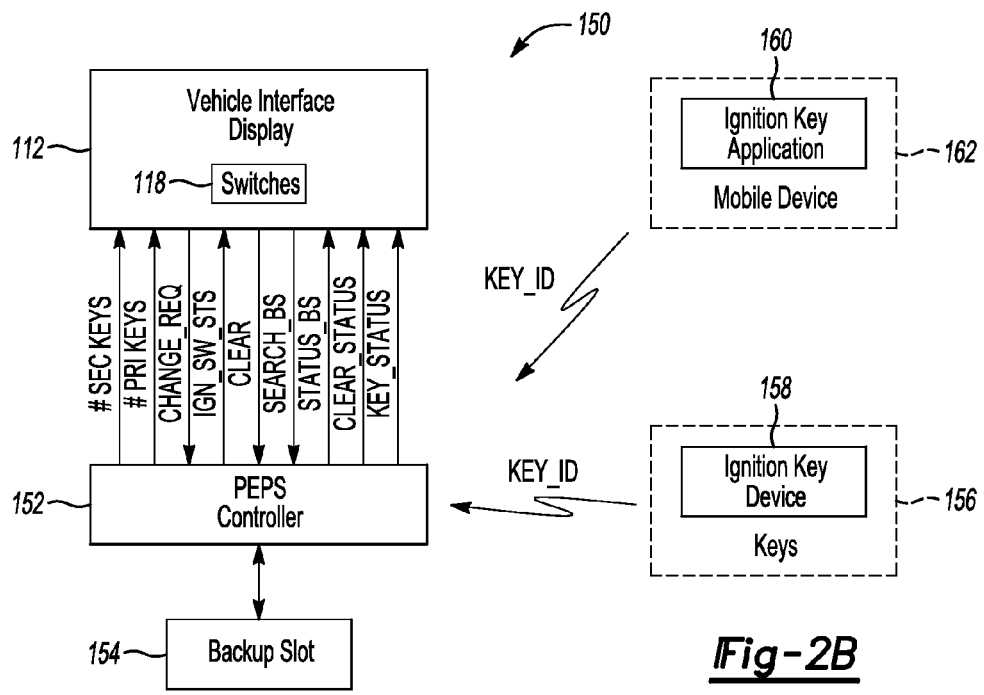
FIG. 2B depicts a system for programming keys to a vehicle to establish primary and secondary drivers in accordance to another embodiment of the present invention.

Referring now to FIG. 2B, a system 150 for programming keys to a vehicle to establish primary and secondary drivers in accordance to one embodiment of the present invention is shown. The system 150 includes the vehicle interface display 112, a passive entry passive start (PEPS) controller 152, and a backup slot 154. The PEPS controller 152 may be used in place of the PATS controller 116 as illustrated in FIG. 2A. While FIG. 2B generally illustrates that the PEPS controller 152 is positioned external to the vehicle interface display 112, other such implementations may include positioning the PEPS controller 152 within the vehicle interface display 112 or within any other such controller in the vehicle. The particular placement of the PEPS controller 152 may vary based on the desired criteria of a particular implementation.

In general, the PEPS function is a keyless access and start system. The driver may own two or more keys 156 that may be in the form of an electronic transmission device (e.g., a key fob, or a mobile device). With the PEPS implementation, the user is not required to use a mechanical key blade to open the door of the vehicle or to start the vehicle. Such key 156 may each include a mechanical key to ensure that the driver can access and start the vehicle in the event the keys 156 and/or mobile device 160 exhibit low battery power. The keys 156 or mobile device 160 each include an ignition key device 158 or application 162 embedded within for communicating with the PEPS controller 152. The transponder of the ignition key device 158 and/or mobile device 162 may be adapted to send the key number and encrypted data on the signal KEY_ID as an RF signal to the PEPS controller 152. To gain access or entry into the vehicle with the keys 156 or mobile device 160 in the PEPS implementation, the driver may need to wake up the PEPS controller 152 to establish bi-directional communication between the keys 156 or mobile device 160 and the PEPS controller 152. In one example, such a wake up may occur by requiring the driver to touch and/or pull the door handle of the vehicle. In response to the door handle being toggled or touched, the PEPS controller 152 may wake up and transmit RF based signals to the keys 156 or mobile device 160. The PEPS controller 152 and the keys 56 or mobile device 160 may undergo a series of communications back and forth to each other (e.g., handshaking) for vehicle access authentication purposes. The PEPS controller 152 may unlock the doors in response to a successful completion of the handshaking process. Once the driver is in the vehicle, the driver may simply press a button positioned on an instrument panel to start the vehicle.

Prior to starting the vehicle, the key/mobile device serial number and the encrypted data are compared to known key/mobile numbers and/or encrypted data in a PEPS look up table in a manner similar to that described in connection with FIG. 2A. The manufacturing code is also checked to ensure the key/mobile device is used for a particular manufacturer of the vehicle. The PEPS LUT may be similar to the PATS LUT as shown in Table 1 and Table 2. As noted above, additional operations are performed as exhibited with the handshaking exercise in addition to matching the data received on the signal KEY_ID with the data in the LUT (e.g., key serial number and encryption data) to ensure that the user is properly authorized to enter the vehicle and to start the vehicle with the PEPS implementation. As noted above in connection with FIG. 2A, all of the keys/mobile devices are generally assigned a primary key status when the vehicle is built and while the vehicle is in transit from the manufacturing plant to the dealer. Such a condition may be reflected under the 'TYPE' heading as shown in Table 1 and Table 2. The status of the key will change from primary to secondary in response to the user programming a particular key/mobile device via the vehicle interface display 112. As further noted above, the PEPS controller 152 ascertains the key status (or driver status) of the key/mobile device (e.g., whether primary or secondary) by decoding the key/mobile device number and/or encrypted data received on the signal KEY_ID and looking up the corresponding key/mobile device type (e.g., primary or secondary) under the 'TYPE' heading of the LUT. The PEPS controller 152 is configured to transmit the signal KEY_STATUS on the multiplexed bus to the vehicle interface display 112. The PEPS controller 152 and/or the vehicle interface display 112 may transmit the signal KEY_STATUS to any controller or module in the vehicle so that the functionality or operation performed by a particular controller (or module) may be selectively controlled based on the driver status.

The PEPS controller 152 may also transmit the signal IGN_SW_STS to the cluster 112. The PEPS controller 152 determines that the key ignition status is in the run position in response to the driver toggling the brake pedal and depressing the start switch. The driver may designate (or program) a particular key/mobile device as a secondary key. In such a case, the vehicle interface display 112 may prompt the driver to place the key 156 or mobile device 160 on the backup slot 154 to program that particular key/mobile device so that the driver knows which key/mobile device is being programmed as a secondary key. Such a condition takes into account that the driver may have two or more keys/mobile devices in the vehicle while programming a key as a secondary key. The vehicle interface display 112 may send a command signal SEARCH_BS to the PEPS controller 152 to determine whether the user placed the key 156 or mobile device 160 on the back up slot 154. It is generally contemplated that a key or mobile device used to first gain access to the vehicle or to authenticate starting the vehicle may not be necessarily the key or mobile device that is placed on the backup slot 154. For example, another or additional key/mobile device (e.g. key not used to gain entry into the vehicle or start the vehicle) may be placed on the back up slot 154 for programming. In such an example, the additional key or mobile device may transmit the signal KEY_ID prior to programming to the PEPS controller 152 while on the back up slot 154.

The PEPS controller 152 transmits a signal STATUS_BS to the vehicle interface display 112. The signal STATUS_BS generally corresponds to whether the user has placed the particular key or mobile device that is to be programmed as a secondary driver on the backup slot 154. It is generally contemplated that the backup slot 154 may be coupled directly to the vehicle interface display 12 instead of the PEPS controller 152. The PEPS controller 152 may transmit the signals IGN_SW_STS, STATUS_BS and KEY_STATUS over the multiplexed bus to the vehicle interface display 112. The operation of placing the key 156 or mobile device 160 that is desired to be programmed on the backup slot 154 as a secondary key is optional. Other such implementations may instead program the key that was used to unlock the vehicle and start the engine of the vehicle.

In general, the PEPS controller 152 may update the value under the 'TYPE' heading of Table 1 and/or Table 2 for a particular key or mobile device from a primary to secondary key in response to the user programming the key as a secondary key via the vehicle interface display 112 and/or the user placing the key/mobile device that is desired to be programmed on the backup slot 154.

The driver may optionally clear all keys/mobile devices that were designated as secondary keys via the vehicle interface display 112. In such a case, the driver may select the corresponding menus via the vehicle interface display 112 to clear all keys or mobile devices that were programmed as secondary keys. The vehicle interface display 112 transmits the signal CLEAR to control the PEPS controller 152 to clear (or change) the secondary keys to primary keys. The PEPS controller 152 may transmit the signal CLEAR_STATUS to the vehicle interface display 112 to notify the vehicle interface display 112 that the keys programmed as secondary keys have been changed to primary keys. The PEPS controller 152 transmits a signal #PRIKEYS and #SECKEYS to the vehicle interface display 112 which are indicative of the number of primary keys in the LUT and the number of secondary keys in the LUT, respectively. The PEPS controller 152 transmits the signals #PRIKEYS and #SECKEYS in response to control signals (not shown) by the vehicle interface display 112. It is generally contemplated that the signals KEY_STATUS, #PRIKEYS, and #SECKEYS (as well as the signal CLEAR_STATUS) may be transmitted as one or more messages over the multiplexed bus to the vehicle interface display 112. For example, the data on the signals KEY_STATUS, #PRIKEYS, #SECKEYS, and CLEAR_STATUS may be transmitted as hexadecimal based data within a signal message over the multiplexed data bus. Likewise, the vehicle interface display 112 may transmit the data on the signal CHANGE_REQ and CLEAR as hexadecimal based data within a single message over the multiplexed data bus.

Figure 2C:
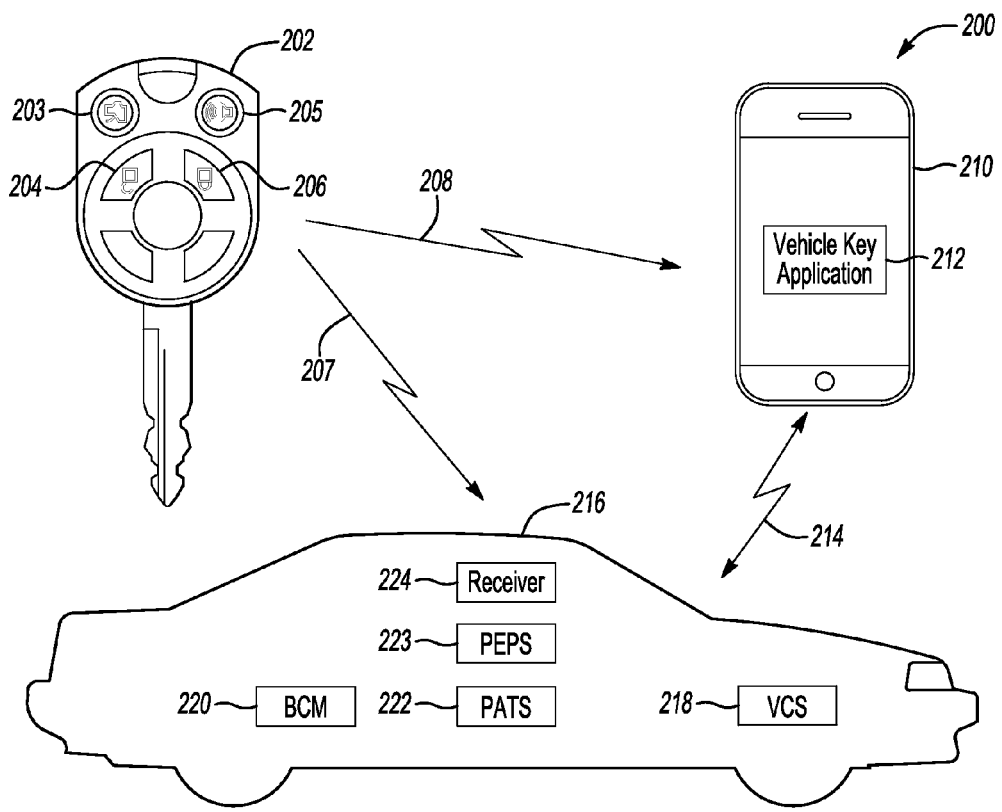
FIG. 2C is an illustrative example of using a key fob to configure and program a mobile device as a key fob.

FIG. 2C is an illustrative example of using a key to configure and program a mobile device with the key security codes.

The system 200 includes a vehicle key 202, a mobile device 210, and a vehicle computing system 218 enabling one or more processors to receive instructions from the mobile device once it has been configured with the key security codes. The mobile device 210 programmed as a key may be implemented by having a vehicle key enabled to transmit security codes using RFID or any other short range wireless communication technology.

The vehicle key may include at least an integrated circuit configured to transmit one or more functions to a vehicle computing system 218. The one or more functions transmitted to a VCS 218 may include, but is not limited to, commanding a vehicle 216 to unlock 204 its doors, to lock 206 its doors, to open the trunk 203, and/or to sound a vehicle alarm 205. A combination of and/or sequential selection of the commanding vehicle function inputs on the vehicle key may allow for additional functions. For example, if a user presses the unlock 204 door input on the key the driver door will unlock, and if the user presses the unlock 204 door input twice, all the doors on the vehicle will unlock. Another example of a user to combine the key fob inputs to achieve additional commanding vehicle functions includes, but is not limited to, the use of selecting to press the lock 206 doors input twice within a predetermined amount of time to audible hear verification that the doors on the vehicle 216 are locked.

The vehicle key may include an ignition key device embedded therein for communicating with the vehicle 216. The ignition key device comprises a transponder. The transponder includes an integrated circuit and an antenna. The transponder is adapted to transmit a signal in the form of a radio frequency (RF) signal to a (PATS) controller 222 with the use of a signal receiver 224 in the vehicle 216. The PATS controller may communicate with the VCS 218 and/or body control module (BCM) via a multiplexed data link communication bus (or multiplexed bus). The multiplexed bus may be implemented as a High/Medium Speed Controller Area Network (CAN) bus, a Local Interconnect Network (LIN), or any such suitable data link communication bus generally situated to facilitate data transfer between controllers (or modules) in the vehicle 216.

The signal 207 being transmitted from the key transponder generally comprises RF data that corresponds to a manufacturer code, a corresponding key serial number and encrypted data. The key serial number and the encrypted data are used to authorize the VCS 218 to start the vehicle in the event the encrypted data corresponds to predetermined encrypted data stored in a look up table of the PATS 222 controller. The PATS 222 controller may use the key number and/or the encrypted data transmitted from the key fob security code signal to determine if the key is from a primary user or a secondary user.

The vehicle key 202 may also be configured to transmit to a PEPS controller 223 allowing for wireless transmission of vehicle control functions without pressing any buttons on the key fob. For example, the PEPS may become initialized by requiring the driver to touch and/or pull the door handle of the vehicle. In response to the door handle being toggled or touched, the PEPS controller 223 may wake up and transmit RF based signals to the keys 202. The PEPS controller 223 and the keys 202 may undergo a series of communication signals 207 back and forth to each other (e.g., handshaking) for vehicle access authentication purposes. The PEPS controller 223 may unlock the doors in response to a successful completion of the handshaking process. Once the driver is in the vehicle, the driver may simply press a button positioned on an instrument panel to start the vehicle.

In one embodiment, the vehicle key 202 may transmit 208 the vehicle security codes to one or more mobile devices 210. The vehicle key may be initialized with a button sequence to begin transmission of the vehicle security codes. For example, the user may hold down lock 206 button and unlock 204 button at the same time for five seconds to initiate the vehicle key to begin the transmission of the vehicle security codes. The vehicle key 202 may transmit 208 the security codes to a mobile device using a transponder that may include, but is not limited to, an integrated circuit and antenna. The vehicle key 202 may include a one or more processors communicating with an antenna to wirelessly communicate vehicle security codes. The transmission of the security codes from the vehicle key 202 may be accomplished using wireless communication including, but not limited to, Bluetooth, WiFi, and/or near field communication.

The mobile device 210 may receive the security codes from the vehicle key and allow a software application 212 to be configured to perform one or more vehicle controls using the mobile device. The vehicle key application 212 may be an application that was developed and/or associated with the vehicle manufacturer.

For example, when a customer buys a vehicle at a dealership she may receive one key 202 associated with the vehicle. The customer may then download an application to their mobile device and use that one key to transmit the vehicle security codes to the mobile device. Once the vehicle security codes have been transmitted to the mobile device, the customer may then use that mobile device 210 as the vehicle key. This may allow the vehicle manufacture to eliminate distribution of multiple keys for each developed vehicle. The mobile device vehicle key may also allow the vehicle driver to make additional copies of a vehicle key on one or more hand held mobile devices while eliminating the need carry around the actual vehicle key.

In one embodiment, the one or more security codes may be communicated from the VCS 218 to the mobile device 210 using wireless technology 214 including, but not limited to, Bluetooth. In this embodiment, a vehicle customer may initiate the VCS using the vehicle key 202 to commence the transfer of the one or more security codes to the mobile device 210. The mobile device may be located in the vehicle cabin and may be communicating with the VCS. The process may require the mobile device to be paired with the VCS before the transmission of the one or more security codes are wirelessly transmitted. The process of requiring the vehicle key 202 to initiate the VCS 218 to transfer the one or more security codes requires the mobile device to be in close proximity of the vehicle.

The customer may request the transfer of the one or more vehicle security codes to the mobile device using the VCS 218 interface/display. The process may require that the mobile device be placed in a specific area in the vehicle cabin before the transfer of security codes begins. For example, the mobile device may have to be placed in a backup slot before transmission of codes. After the transmission of the one or more security codes are sent to the mobile device, the customer may remove the vehicle key 202 from the vehicle and now use the mobile device 210 to initiate the VCS 218. The mobile device initiating the VCS may include, but is not limited to, wireless communication with one or more vehicle controls, features and/or functions. The one or more vehicle controls includes, but is not limited to, keyless control of starting the vehicle, unlocking/locking doors, and/or opening the trunk with the mobile device 210.

In another embodiment, the mobile device vehicle key application 212 may allow control of vehicle functions once the PEPS controller 223 has initialized by requiring the driver to touch and/or pull the door handle of the vehicle. In response to the door handle being toggled or touched, the PEPS controller 223 may wake up and transmit RF based signals to the mobile device 210. The PEPS controller 223 and the mobile device 210 may undergo a series of communications 214 back and forth to each other (e.g., handshaking) for vehicle access authentication purposes. The PEPS controller 223 may unlock the doors in response to a successful completion of the handshaking process. Once the driver is in the vehicle, the driver may simply press a button positioned on an instrument panel to start the vehicle. The communication 214 between the vehicle 216 and mobile device 210 may be accomplished using wireless communication including, but not limited to, Bluetooth, WiFi, and/or near field communication.

The mobile device key application may also control vehicle functions with the use of one or more mobile device functions including, but not limited to, voice commands, touch screen, and/or other mobile device communication functions allowing the user to request control of vehicle devices features that are generally configured to communicate with the VCS 218. For example, if a user is approaching the vehicle, the PEPS may be initialized by a short range communication signal transmitted from the mobile device. The mobile device may transmit a signal allowing for the handshaking authorization process to begin with the PEPS controller 223. Once the handshaking between the mobile device and the PEPS is complete, the user may unlock the doors using vocal commands that may be received by the mobile device microphone and processed by the vehicle key application software to transmit 214 the unlock request signal to the PEPS controller 223. The PEPS controller may receive the request to unlock the doors and transmit the command to unlock the doors to the BCM 220.

Figure 3A:
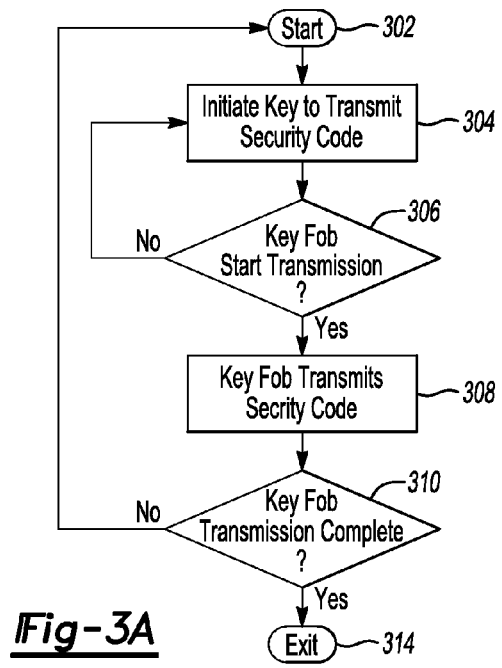
FIG. 3A is a flow chart illustrating an example method of initializing a key fob to transmit one or more security codes.

FIG. 3A is a flow chart illustrating an example method of initializing a key fob to transmit security codes to a handheld device. The vehicle key fob may include, but is not limited to, an integrated circuit with an antenna. The vehicle key fob may contain vehicle security codes allowing one or more vehicle driver/occupant to wireless communicate to the VCS for performing one or more vehicle control functions. The one or more vehicle control function includes, but is not limited to, unlocking/locking doors, starting vehicle, engaging/disengaging alarm and/or opening the trunk.

At step 302, the vehicle key may be embedded with security codes associated with the vehicle during manufacturing and/or at a vehicle dealership. A user may initiate the transmission of the security codes from the vehicle key to a handheld device by pressing one or more buttons on the vehicle key at step 304. To initiate a vehicle key for transmission of security codes may be a combination of button inputs received and recognized by the integrated circuit as the authorization to begin transmission of codes. For example, the authorization to begin transmission of security codes from the integrated circuit on the vehicle key may be the holding down of one or more buttons for a predefined amount of time.

At step 306, the integrated circuit may recognize one or more inputs for authorization to begin the wireless transmission of security code signals to a handheld device. If the integrated circuit does not recognize the one or more and/or combination of button inputs received, the integrated circuit may deny the request to transmit the one or more vehicle security codes. Once the integrated circuit approves the authorization to start the transmission, the vehicle key transmits the one or more security code at step 308. The transmission of security codes may be accomplished using wireless communication including, but not limited to, Bluetooth, WiFi, or other secured short range wireless communication technology.

At step 310, if no interruption is made to the communication between the vehicle key and mobile device, the vehicle key may complete the transmission of vehicle security codes. If the vehicle key is interrupted, the integrated circuit may require the user to start from the beginning of the transmission process at step 302. The vehicle key may determine transmission is complete using one or more methods including, but not limited to, a timer, communication signal from the handheld device, and/or a signal within the integrated circuit.

One example that may be used to allow the user to know when the vehicle key transmission of security codes has begun and/or is complete may be with the use of an LED positioned on the key. The LED may be held in a solid state during transmission and may blink when transmission is complete. After the vehicle key has complete transmission of the security codes the transmission process may exit at step 314.

FIG. 3B is a flow chart illustrating an example method of initializing a mobile device to receive key fob security codes. The mobile device may be embedded with a vehicle key application with a communication circuit allowed for receiving and transmitting short range wireless communication. The communication circuit may include an integrated circuit with an antenna. The mobile device may receive vehicle key security codes using a secured short range wireless communication technology. The mobile device application may be developed by a vehicle manufacture for encrypted vehicle security codes and to allow vehicle function control features tailored specifically for a certain vehicle make and/or model.

At step 316, the mobile device and/or handheld device may download a vehicle key application to allow for interaction and/or control of vehicle functions using the handheld device. The mobile device application may be configured to the user's mobile device and initiated for receiving one or more vehicle security codes at step 318. Once the mobile device application is setup and/or configured on the device, it may be ready to receive the transmission of the vehicle security codes at step 320. If the user has not configured and/or setup the software application to receive the vehicle key security codes, the mobile device may request additional information to initiate the mobile device application before receiving the security codes at step 318.

At step 322, the mobile device may detect the vehicle key to initiate transmission once the two devices are in close proximity of each other to allow for a secure short range wireless communication of the security codes. The transmission between the vehicle key and the mobile device may be accomplished using radio frequency identification technology. The vehicle key may transmit one or more messages to the mobile device including, but not limited to, messages indicative of security codes. The mobile device may notify the user that the mobile device detects the vehicle key and/or the transmission of the data at step 324. If the mobile device does not detect the vehicle key and/or the wireless transmission of the vehicle security codes, the software application may notify the user to put the two devices in a closer proximity of each other at step 322.

The mobile device may receive the security codes using wireless communication including, but not limited to, WiFi, Bluetooth or other short range wireless communication to ensure a secure transmission of the data. The short range communication may include, but is not limited to, near field communication. The mobile device may notify if the transmission of the vehicle security code is complete at step 330.

The mobile device may stay connected to receive the vehicle key security data until the transmission is complete.

At step 332, once the mobile device received all the security properties from the vehicle key, the mobile device may now act as a vehicle key. The mobile device software application may exit the vehicle key data transmission after completion of vehicle security code configuration on the mobile device at step 334.

The mobile device software application may be used to configure a primary or secondary key status for that mobile device vehicle key. The configuration may be done by typing a pin number on the application. The pin number may be associated as the primary or secondary key. The mobile device software application may also configure settings for the primary or secondary key. The configuration of settings may include, but is not limited to, speed settings, radio controls, and/or cellular telephone usage.

For example, the vehicle owner may type in a pin number onto a mobile device software application that belongs to his teenage driver to assign that mobile device vehicle key as a secondary key. The vehicle owner may configure settings for the secondary key to limit the vehicle speed to 65 mph. The vehicle owner may configure settings for the secondary key to limit radio controls including, but not limited to, station selection and volume limit. The vehicle owner may have a mobile device configured as a primary key; therefore no vehicle control restrictions are associated with his mobile device vehicle key.

The software application running on the mobile device may continuously run in the background of the operating system so that it may automatically communicate with the PEPS controller and/or the VCS. The user may have the option to disabled the vehicle key software application on the mobile device, and/or establish predefined timers when to periodically be on or in standby mode. For example, the vehicle key software application on the mobile device may initiate once it receives a signal from the VCS.

Figure 4:
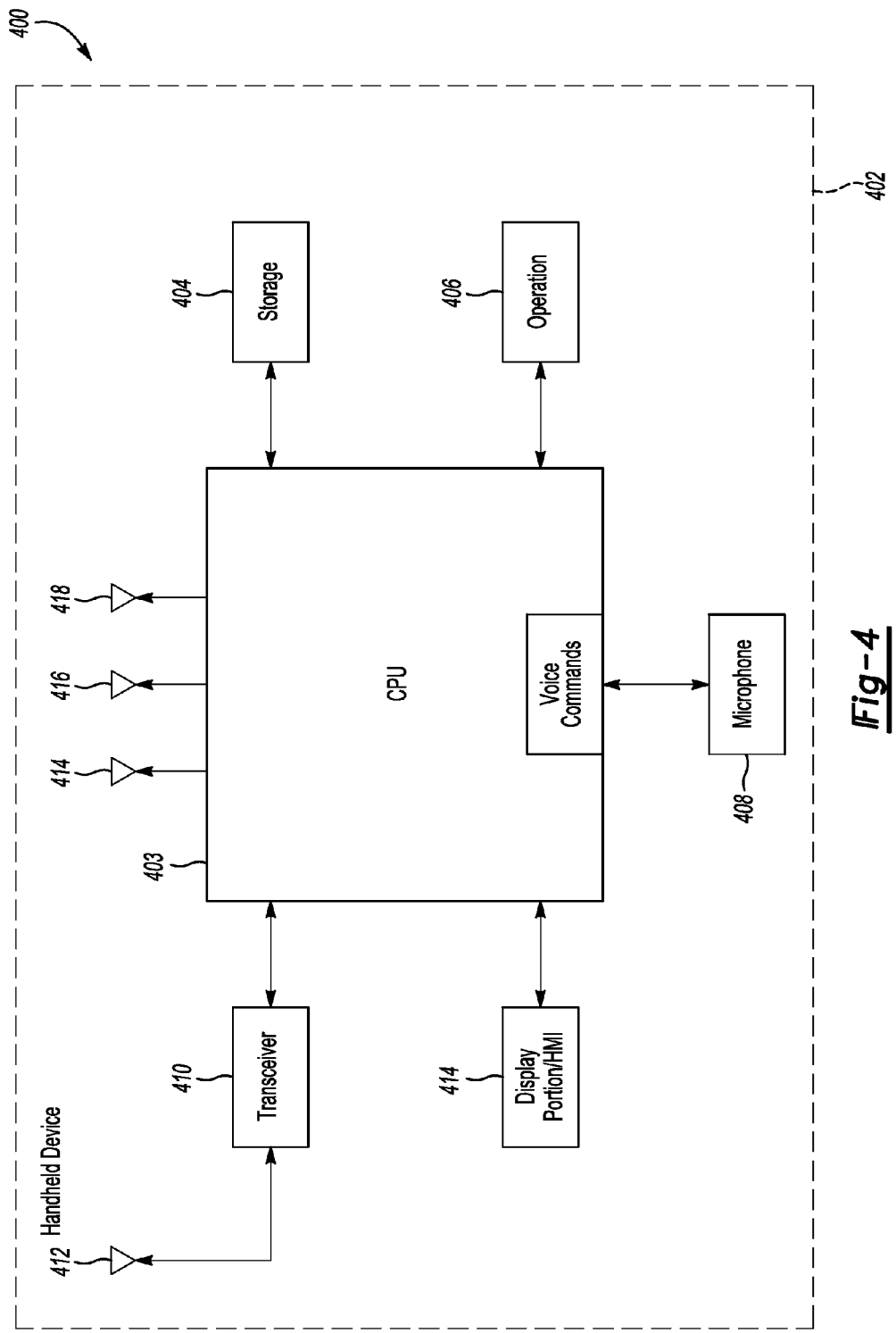
FIG. 4 is an illustrative example of a mobile device application implementing key fob functions.

FIG. 4 is an illustrative example of a handheld device application 400 implementing vehicle key control functions. The handheld device 402 has a transceiver 410 capable of performing communication with a vehicle key and the VCS including, but not limited to PEPS controller. The transceiver 410 may also be used for performing wireless communication using short range technology with the VCS and/or PEPS of the vehicle. Other forms of wireless communication may be performed by the handheld device 402 including, but not limited to, WiFi 414, Bluetooth 416, and/or cellular 418. The other forms of wireless communication may be embedded as one or a combination of wireless technology on a handheld device. A storage portion 404 in the mobile device 402 may store inherent ID information for communicating with the vehicle system including the vehicle security codes. The mobile device may include, but not limited to, a display portion 414 having a liquid crystal display device with touch screen technology, and an audio processing portion including a speaker and a microphone 408.

The storage portion 404 of the handheld device may also contain the primary or secondary key identification/assignment for that device. The primary or secondary key assignment may be accomplished by typing in a pin using the display portion 414 of the handheld device. The mobile device may receive a change of status indicating a primary key to a secondary key. The change of status may be received using the HMI on the mobile device, or may be wirelessly received from the VCS and/or the vehicle key.

The transceiver 410 is connected with an antenna 412 enabling vehicle control commands using speech, touch screen selection, and other forms of commanding control of vehicle functions using the handheld device transmitted to the VCS and/or PEPS. For example, once the PEPS and handheld device has completed the handshaking process, the user may make a speech request to unlock the doors, an audio signal is received by the microphone 408 of the device and is converted using voice command software to a signal for transmission from the transceiver 410 to the PEPS. By converting the voice commands collected from the microphone to a signal and transmitting the signal via the antenna allows speech control functions to be carried out at the vehicle.

The handheld device may allow one or more applications to continuous run in the operation portion 406 of the processor 403. The operation portion 406 of the handheld device may allow for the software application to be initiated as soon as it receives a signal from the PEPS and/or VCS. In another alternative embodiment, the operation portion 406 may initiate the PEPS and/or VCS controller by periodically transmitting a signal looking for the vehicle.

The mobile device may present vehicle control functions on the display portion 414, as you would normally see on a vehicle key, including unlock, lock, truck open, and/or an alarm. Other features may be implemented since the vehicle control functions not limited to space restraints as it would be when designing these function on a traditional vehicle key. Other features may include, but is not limited to, rolling the windows down, opening the fuel cap door, and/or starting the vehicle.

FIG. 5 is a flow chart illustrating an example method of a vehicle computing system receiving instructions from a mobile device key fob. The mobile device key fob communicating with the PEPS and/or VCS may be implemented through a computer algorithm, machine executable code, non-transitory computer-readable medium, or software instructions programmed into a suitable programmable logic device(s) of the vehicle, such as the VCS, the entertainment module, other controller in the vehicle, or a combination thereof. Although the various steps shown in the mobile device key fob flowchart diagram 500 appear to occur in a chronological sequence, at least some of the steps may occur in a different order, and some steps may be performed concurrently or not at all.

At step 502, the user may need to wake up the vehicle communication receiver to establish bi-directional wireless communication between the mobile device and the PEPS controller and/or VCS. In one example, such a wake up may occur by requiring the user to touch and/or pull the door handle of the vehicle. In response to the door handle being toggled or touched, the receiver may transmit a wake up signal to the PEPS controller. The PEPS controller may initiate the transmission of RF based signals to the mobile device at step 504.

Another example of initializing the mobile device and vehicle handshake may be done using Bluetooth low energy technology. Bluetooth low energy allows low-power and low-latency, applications for wireless device within a short range (up to 50 meters/160 feet). This facilitates the mobile device being recognized by the VCS as the user approaches the vehicle without using a lot of vehicle battery power.

At step 506, the PEPS controller and the mobile device may undergo a series of communications back and forth to each other (e.g., handshaking) for vehicle access authentication purpose. If the handshake is accomplished, the mobile device may transmit the one or more security properties to the VCS and/or PEPS controller. The PEPS controller and/or VCS may receive from the mobile device one or more securities codes at step 508.

At step 510, the VCS and/or PEPS controller may determine if the mobile device transmitted the correct security code properties associated with that vehicle to allow communication between the VCS and mobile device application. If the mobile device transmitted the correct security codes associated with that vehicle, the VCS and/or PEPS controller may allow control of the received vehicle functions from the mobile device at step 512.

The mobile device may transmit commands to the PEPS and/or VCS initiating keyless entry and/or keyless engine start features. The PEPS and/or VCS controller may receive the control commands from the device and allow execution of the commanded vehicle function and/or feature at step 513. The PEPS and/or VCS controller may transmit the vehicle control command to the appropriate controller or subsystem in the vehicle. The mobile device may terminate communication with the vehicle if the user decides to terminate the connection at step 514.

Another example of terminating communication between the mobile device and the VCS and/or PEPS may be by the user exiting the vehicle and the increasing distance of the mobile device proximately to the PEPS as the user walks away from the vehicle. If the mobile device transmitted incorrect security codes, the PEPS controller and/or VCS may terminate communication to the mobile device at step 514.

Figure 6:
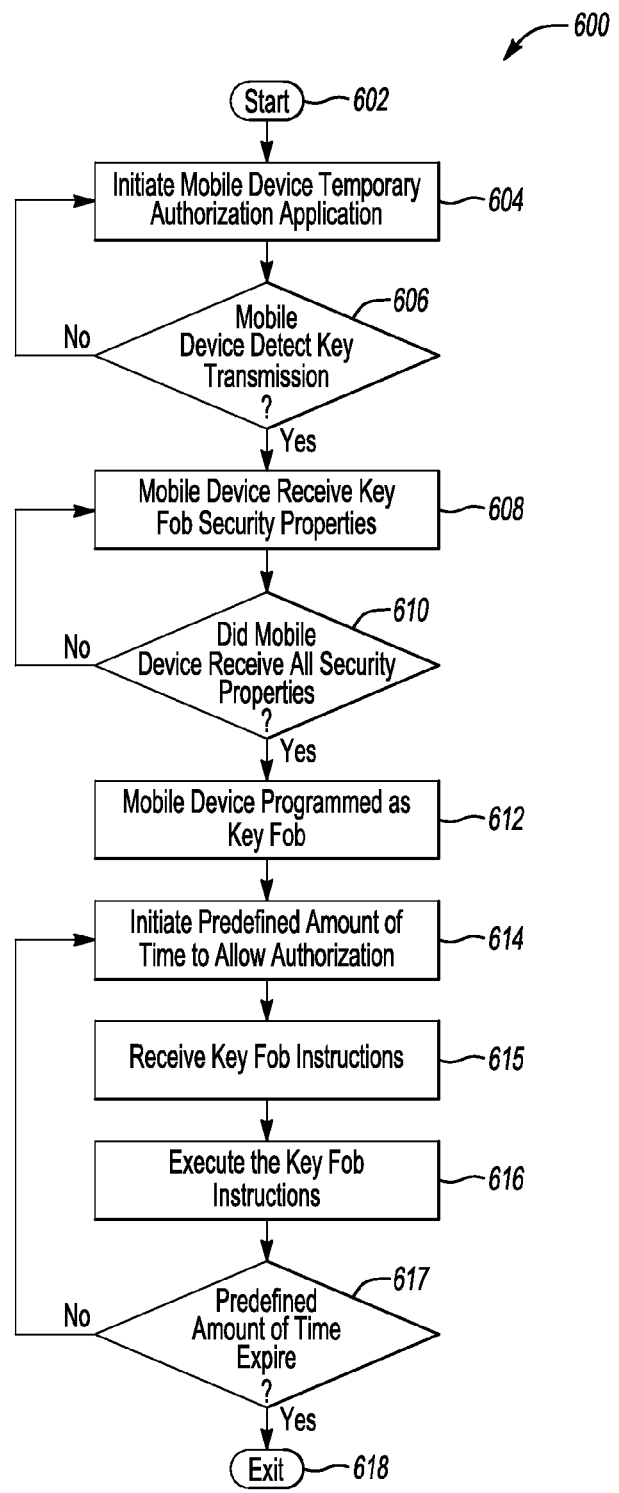
FIG. 6 is a flow chart illustrating an example method of initializing a mobile device to enable key security codes for a predefined amount of time.

FIG. 6 is a flow chart illustrating an example method of initializing a mobile device to enable key security codes for a predefined amount of time. The mobile device may be enabled as a vehicle key for a predefined amount of time to allow temporary user access 600 to a vehicle. An example of a temporary user accessing a vehicle may include, but is not limited to, the vehicle rental business.

At step 602, the mobile device and/or handheld device may download a vehicle key application to allow for interaction and/or control of vehicle functions using the handheld device for a predetermined amount of time. The mobile device application may be configured to the user's mobile device and initiated for receiving one or more vehicle security codes for temporary authorization at step 604. Once the mobile device application is setup and/or configured on the device, it may be ready to receive the transmission of the vehicle security codes.

Once the two devices are in close proximity of each other to allow for a secure short range wireless communication of the security codes, the mobile device may detect the RF identification signal from the vehicle key to initiate transmission. The mobile device may notify the user that the mobile device detects the vehicle key and/or the transmission of the data at step 606. If the mobile device does not detect the vehicle key and/or the transmission of the one or more vehicle security codes, the software application may notify the user to put the two devices in a closer proximity of each other while reinitializing the devices at step 604.

At step 608, the mobile device may receive the security codes using short range wireless communication to ensure a secure transmission of the data. The short range communication may include, but is not limited to, near field communication. The mobile device may notify if the transmission of the vehicle security code is complete at step 610. The mobile device may stay connected to receive the vehicle key security data until the transmission is complete at step 608.

At step 612, once the mobile device received all the security properties from the vehicle key, the mobile device may now act as a vehicle key. The transmitted security codes received by the mobile device may include a predefined amount of time to allow authorization to the vehicle. In another alternative embodiment, the mobile device software application may be specific for temporary authorization based on a predefined amount of time once the device receives the one or more vehicle security codes. The predefined amount of time to allow authorization may be set on the mobile device application at step 614.

At step 615, the mobile device application may allow receiving vehicle functions from the mobile device. The mobile device may execute and transmit commands to the PEPS and/or VCS initiating one or more vehicle commands including, but not limited to, keyless entry and/or keyless engine start features at step 616. The PEPS and/or VCS controller may receive the control commands from the device and allow execution of the commanded vehicle function and/or feature.

At step 617, the mobile device may access the vehicle and/or control vehicle functions using the device as a wireless key fob until the predefined amount of time expires. An example may be a car rental operation may allow the temporary driver of the vehicle to download a software application to their mobile device. The mobile device may continue to receive, execute and transmit vehicle control commands until the predefined amount of time expires. The mobile device software application may exit the vehicle key data transmission after expiration of the predefined amount of time at step 618.

Once the application is downloaded to the mobile device, the vehicle key with an integrated circuit with an antenna may be used to transmit the vehicle security codes to the device. The downloaded software application may initialize a timer once the security codes have been received by the mobile device. The timer may be set by the rental operation on the mobile device noting that the temporary user may have a limited amount of time to access the vehicle using the mobile device.

Another example may be a parent allowing their teenager to take the car out for a predefined amount of time by implementing the mobile device temporary user software application. As mentioned above, the teenager may download a software application to their mobile device. The parent may transmit the vehicle security code to the teenager's mobile device using the vehicle key. The mobile device application may initiate a predefined amount of time to allow authorization by having the parent set the amount of time before the mobile device terminates communication with the PEPS and/or VCS.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computing system comprising:
a processor in communication with a backup slot and a user-interface display, the processor programmed to,
in response to a customer security code transfer request, prompt a driver via the user-interface display to place a mobile device at the backup slot, and
in response to the mobile device being placed at the backup slot, transmit one or more vehicle computing system security codes to the mobile device to implement one or more vehicle control functions using the one or more security codes.

2. The vehicle computing system of claim 1, wherein the processor is further programmed to initialize a predefined timer for the one or more vehicle computing system security codes; and enable the mobile device to implement one or more vehicle control functions using the security codes during the predefined timer.

3. The vehicle computing system of claim 1, wherein the backup slot wirelessly transmits the one or more vehicle computing security codes using near field communication.

4. The vehicle computing system of claim 1, wherein the user-interface display is configured to output instructions to a user and the backup slot is configured to wirelessly transmit the one or more vehicle computing system security codes.

5. The vehicle computing system of claim 1, wherein the processor is further programmed to receive input at the user-interface display to define the mobile device as a primary key or a secondary key.

6. The vehicle computing system of claim 5, wherein the processor is further programmed to configure the mobile device via the one or more vehicle computing system security codes, to either be identifiable as the primary key or the secondary key, wherein the primary key provides greater control over vehicle functionality than the secondary key.

7. The vehicle computing system of claim 5, wherein the primary key is configured to activate or deactivate at least one vehicle feature.

8. The vehicle computing system of claim 1, wherein the one or more vehicle control functions is at least one of unlocking doors, locking doors, starting the vehicle, and opening a vehicle trunk.

9. A vehicle computing system comprising:
a processor programmed to
detect a valid key fob configured to control a vehicle control function; and
in response to a request to create a mobile device key fob via a user interface and a detected valid key fob, transmit vehicle security codes to a connected mobile device to implement the vehicle control function on the mobile device key fob when the valid key fob is not present.

10. The vehicle computing system of claim 9, wherein the processor is further programmed to establish a communication connection with the mobile device using at least one of near field communication, BLUETOOTH, and Bluetooth Low Energy.

11. The vehicle computing system of claim 10, wherein the processor is further programmed to initialize a predefined timer for the vehicle security codes; and enable the mobile device to implement the vehicle control function using the security codes during the predefined timer.

12. The vehicle computing system of claim 9, wherein the processor is further programmed to receive input at the user interface to define the mobile device as a primary key or a secondary key.

13. The vehicle computing system of claim 12, wherein the processor is further programmed to configure the mobile device via the vehicle security codes, to either be identifiable as the primary key or the secondary key, wherein the primary key provides greater control over vehicle functionality than the secondary key.

14. The vehicle computing system of claim 12, wherein the primary key is configured to activate or deactivate at least one vehicle feature.

15. The vehicle computing system of claim 9, wherein the vehicle control function is at least one of unlocking doors, locking doors, starting the vehicle, and opening a vehicle trunk.

16. A vehicle computing system comprising:
at least one processor programmed to
receive a request to create a mobile device key fob from a user interface; and
transmit vehicle security codes to a backup slot for communication to a mobile device based on the request, wherein the vehicle security codes enable the mobile device to implement one or more vehicle control functions on the mobile device when a vehicle key fob is not present.

17. The vehicle computing system of claim 16, wherein the processor is further programmed to initialize a predefined timer for the vehicle security codes; and enable the mobile device to implement one or more vehicle control functions using the security codes during the predefined timer.

18. The vehicle computing system of claim 16, wherein the processor is further programmed to receive a signal from the user interface to define the mobile device as a primary key or a secondary key.

19. The vehicle computing system of claim 18, wherein the processor is further programmed to configure the mobile device via the vehicle security codes, to either be identifiable as the primary key or the secondary key, wherein the primary key provides greater control over vehicle functionality than the secondary key.

20. The vehicle computing system of claim 16, wherein the backup slot is wirelessly transmitting the vehicle security codes using near field communication.

* * * * *